(12) United States Patent
Kim et al.

(10) Patent No.: US 11,926,529 B2
(45) Date of Patent: Mar. 12, 2024

(54) AEROGEL BLANKET AND METHOD FOR PRODUCING SAME

(71) Applicant: LG CHEM, LTD., Seoul (KR)

(72) Inventors: Young Hun Kim, Daejeon (KR); Se Won Baek, Daejeon (KR); Sung Min Yu, Daejeon (KR); Kyung Seok Min, Daejeon (KR); Hyun Woo Jeon, Daejeon (KR); Sang Woo Park, Daejeon (KR); Bong June Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 290 days.

(21) Appl. No.: 17/414,027

(22) PCT Filed: Aug. 28, 2020

(86) PCT No.: PCT/KR2020/011536
§ 371 (c)(1),
(2) Date: Jun. 15, 2021

(87) PCT Pub. No.: WO2021/054644
PCT Pub. Date: Mar. 25, 2021

(65) Prior Publication Data
US 2022/0048778 A1   Feb. 17, 2022

(30) Foreign Application Priority Data
Sep. 18, 2019  (KR) .................. 10-2019-0114993

(51) Int. Cl.
*C01B 33/158* (2006.01)
*B01J 13/00* (2006.01)
(Continued)

(52) U.S. Cl.
CPC ....... *C01B 33/1585* (2013.01); *B01J 13/0091* (2013.01); *C04B 30/02* (2013.01);
(Continued)

(58) Field of Classification Search
CPC ..... B01J 3/008; B01J 13/0091; C01B 33/155; C01B 33/1585; C01B 33/159;
(Continued)

(56) References Cited

U.S. PATENT DOCUMENTS

| 6,068,882 A | 5/2000 | Ryu |
| 2005/0046086 A1 | 3/2005 | Lee et al. |

(Continued)

FOREIGN PATENT DOCUMENTS

| CN | 102557577 | 7/2012 |
| CN | 107531495 A | 1/2018 |

(Continued)

OTHER PUBLICATIONS

Machine translation of WO-2017145359-A1 (Year: 2017).*

(Continued)

*Primary Examiner* — Colin W. Slifka
*Assistant Examiner* — Logan Edward Laclair
(74) *Attorney, Agent, or Firm* — Bryan Cave Leighton Paisner LLP

(57) ABSTRACT

Provided is an aerogel blanket and a method for producing the same, wherein a catalyzed sol I sufficiently and uniformly impregnated into a blanket in an impregnation tank, and the catalyzed sol is allowed to stay in the impregnation tank for a specific time to control fluidity while achieving a viscosity at which the catalyzed sol can be easily introduced into the blanket, thereby forming a uniform aerogel in the blanket. As a result, the uniformity of pore structure and thermal insulation performance of an aerogel blanket are improved, the loss of raw materials is reduced through the impregnation process, the occurrence of process problems is reduced, and the generation of dust is reduced.

7 Claims, 1 Drawing Sheet

(51) Int. Cl.
   *C04B 30/02* (2006.01)
   *D06M 11/79* (2006.01)
   *F16L 59/02* (2006.01)
(52) U.S. Cl.
   CPC ........... D06M 11/79 (2013.01); F16L 59/028 (2013.01); *C01P 2004/03* (2013.01); *C01P 2006/22* (2013.01); *C01P 2006/32* (2013.01); *C04B 2201/32* (2013.01)
(58) Field of Classification Search
   CPC ............... C01B 33/145; C01P 2006/32; C01P 2004/03; C01P 2006/22; C04B 14/064; C04B 30/02; C04B 2201/32; C04B 28/005; F16L 59/028; D06M 2400/02; D06M 11/79
   See application file for complete search history.

(56) References Cited

U.S. PATENT DOCUMENTS

| | | |
|---|---|---|
| 2005/0167891 A1 | 8/2005 | Lee et al. |
| 2006/0125158 A1 | 6/2006 | Rouanet et al. |
| 2008/0093016 A1 | 4/2008 | Lee et al. |
| 2010/0140840 A1 | 6/2010 | Rouanet et al. |
| 2018/0072578 A1 | 3/2018 | Kim et al. |
| 2018/0086587 A1 | 3/2018 | Kim et al. |
| 2018/0134566 A1 | 5/2018 | Kim et al. |
| 2018/0147811 A1 | 5/2018 | Oh et al. |
| 2018/0179073 A1 | 6/2018 | Oh et al. |
| 2018/0326700 A1 | 11/2018 | Kim |
| 2018/0354805 A1 | 12/2018 | Kim et al. |
| 2020/0216322 A1 | 7/2020 | Min et al. |

FOREIGN PATENT DOCUMENTS

| | | |
|---|---|---|
| CN | 107735385 | 2/2018 |
| CN | 108569912 | 9/2018 |
| EP | 3257812 A1 | 12/2017 |
| EP | 3296264 A1 | 3/2018 |
| EP | 3626680 A1 | 3/2020 |
| JP | 2011-190136 | 9/2011 |
| JP | 2018-535178 | 11/2018 |
| KR | 10-2007-0100738 | 10/2007 |
| KR | 10-2012-0012836 | 2/2012 |
| KR | 20150089319 | 8/2015 |
| KR | 10-1654795 | 9/2016 |
| KR | 10-2016-0122634 | 10/2016 |
| KR | 10-2017-0086831 | 7/2017 |
| KR | 10-2017-0096514 | 8/2017 |
| KR | 10-2017-0112985 | 10/2017 |
| KR | 10-2019-0021956 | 3/2019 |
| KR | 10-1964894 | 4/2019 |
| WO | WO-2017145359 A1 * | 8/2017 |

OTHER PUBLICATIONS

Ma et al., "Preparation and Low-temperature Properties of Fiber Reinforced $SiO_2$ Aerogel Composites," Materials Review 29(10):43-46 and 63 (2015), English Language Abstract included.

Feng et al., "Preparation of Flexible Fiber-Reinforced Aerogel Composites for Thermal Insulation," Rare Metal Materials and Engineering 37(Suppl. 2): 170-173 (2008), English Language Abstract included.

* cited by examiner

AEROGEL BLANKET AND METHOD FOR PRODUCING SAME

CROSS-REFERENCE TO RELATED APPLICATIONS

This application is a National Stage Application of International Application No. PCT/KR2020/011536 filed on Aug. 28, 2020, which claims priority to and the benefit of Korean Patent Application No. 10-2019-0114993, filed on Sep. 18, 2019, in the Korean Intellectual Property Office, the disclosure of which is incorporated herein in its entirety by reference.

TECHNICAL FIELD

The present invention relates to an aerogel blanket and a method for producing the same, wherein the aerogel is uniformly formed in the blanket, thereby having improved physical properties.

BACKGROUND

An aerogel is a super-porous, high specific surface area (≥500 m²/g) material having a porosity of about 90-99.9% and a pore size in the range of 1-100 nm, and is a material excellent in ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for super capacitors, and electrode materials for seawater desalination have been actively conducted.

The biggest advantage of the aerogel is that the aerogel has super-insulation properties exhibiting a thermal conductivity of 0.300 W/m·K or less, which is lower than that of an organic insulation material such as conventional Styrofoam, and that fire vulnerability and the generation of harmful gases in case of fire which are fatal weaknesses of the organic insulation material can be solved.

A typical method for producing a blanket containing an aerogel was performed by impregnating a solution in which a precursor sol and a gelation catalyst are mixed into a fibrous phase during a gel casting process, thereby producing a blanket containing an aerogel. The method has problems in that a sol-gel chemical reaction immediately starts at the time of mixing the precursor sol and the gelation catalyst and the viscosity of the mixed solution increases, causing particles to form before the solution is sufficiently impregnated into the fibrous phase. Therefore, it is difficult to control the rate of gelation, and the aerogel gelled during the process is destroyed or lost, so that the thermal insulation performance of a final product is reduced.

In addition, when a precursor sol and a gelation catalyst are introduced onto a moving element as in a roll-to-roll process, there is a problem in that the precursor sol and the gelation catalyst are not sufficiently impregnated into a fibrous blanket positioned on the moving element, so that non-uniform impregnation occurs on the surface of the blanket, resulting in degraded insulation performance. If an amount of the precursor sol and the gelation catalyst introduced is increased to prevent the problem, the increased amount exceeds an amount which can be impregnated on the fibrous phase, so that the precursor sol and the gelation catalyst exceeding the impregnation amount overflow from the moving element, resulting in generating loss in the process. Furthermore, due to a subsequent gelation process of the overflown mixed phase, a solid such as a powder is formed, thereby forming a scale in a mechanically operated process device, which acts as a process inhibiting factor.

Therefore, the inventors of the present invention have developed the present invention after conducting studies in order to solve such typical problems.

PRIOR ART DOCUMENT

Patent Document
(Patent Document 1) KR10-2012-0012836A

BRIEF DESCRIPTION

Technical Problem

An aspect of the present invention provides a method for producing an aerogel blanket, the method in which the retention time of a catalyzed sol in an impregnation tank is controlled to uniformly penetrate the catalyzed sol having a stable viscosity range into a base material for a blanket, thereby uniformly forming an aerogel in a blanket, and accordingly excellent thermal insulation performance is achieved and an effect of suppressing dust generation is improved.

Another aspect of the present invention provides a method for producing an aerogel blanket, the method capable of minimizing the loss of a catalyzed sol, thereby improving production processing efficiency, as well as suppressing the generation of a scale in a processing device, and reducing dust during the production.

Yet another aspect of the present invention provides an aerogel blanket in which an aerogel is uniformly formed in a blanket, thereby having a small standard deviation of thermal conductivity of the aerogel blanket.

Technical Solution

According to an aspect of the present invention, there is provided a method for producing an aerogel blanket, the method including 1) introducing a precursor solution and a catalyst solution into an impregnation tank and allowing a catalyzed sol to stay in the impregnation tank to increase in viscosity, 2) passing a base material for a blanket through the impregnation tank to allow the catalyzed sol to penetrate into the base material for a blanket, and 3) subjecting the base material for a blanket into which the catalyzed sol has been penetrated to gelation on a moving element, wherein a retention time of the catalyzed sol in the impregnation tank is 0.1 minutes to 40 minutes.

According to another aspect of the present invention, there is provided a method for producing an aerogel blanket, the method in which a catalyzed sol is allowed to stay in the impregnation tank such that the viscosity of the catalyzed sol is 5.5 mPa·s to 100 mPa·s when introduced into the base material for a blanket.

According to yet another aspect of the present invention, there is provided an aerogel blanket having a standard deviation of thermal conductivity in the aerogel blanket of 1.5 mW/m·K or less.

Advantageous Effects

A method for producing an aerogel blanket according to the present invention passes a base material for a blanket through an impregnation tank in which a catalyzed sol having stayed therein for a predetermined period of time is present, thereby allowing the catalyzed sol to penetrate into the base material for a blanket, so that the catalyzed sol can further uniformly penetrate into the base material for a blanket. In addition, when a catalyzed sol is allowed to stay for a specific period of time in an impregnation tank and then penetrate into a base material for a blanket, the viscosity of the catalyzed sol can be controlled to be within a specific range at the time of the penetration into the base material for a blanket, so that the penetration into the base material is facilitated and the fluidity of the sol is reduced during gelation to uniformly form an aerogel in a blanket. Accordingly, the thermal conductivity and of a produced aerogel blanket can be greatly improved and the generation of dust can be greatly suppressed. Particularly, the standard deviation of thermal conductivity in the aerogel blanket can be greatly reduced.

In addition, since the retention time of a catalyzed sol in an impregnation tank is controlled to increase viscosity, it is easy to handle the sol compared to a liquid sol having a very low viscosity, and since there is hardly any loss of raw materials in the impregnation tank, the loss of raw materials can be minimized compared to a method in which a precursor and a catalyst solution are sprayed onto a moving element, and since it is easy to control gelation time, processing efficiency can be improved. In addition, since gelation time can be easily controlled, the gelation time can be shortened to simplify a moving element (conveyor device) of a device used for gel casting.

In addition, when a catalyzed sol according to the present invention stays in an impregnation tank, the retention time thereof is controlled to lower fluidity compared to an initial sol having a low viscosity. Therefore, even when a base material for a blanket having a low density is used, it is possible to prevent the phenomenon in which the sol sinks down during gelation, so that an aerogel can be uniformly formed in the base material for a blanket, an aerogel blanket finally produced can have a high degree of hydrophobicity, and the uniformity of the degree of hydrophobicity according to a position in the aerogel blanket can be secured to an excellent level.

In addition, the present invention can prepare a catalyzed sol which can be easily penetrated into a base material for a blanket in an impregnation tank and having a stable viscosity range, and thus, can have excellent reproducibility during a production process, and can stably maintain a continuous process.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION

Figure 1:
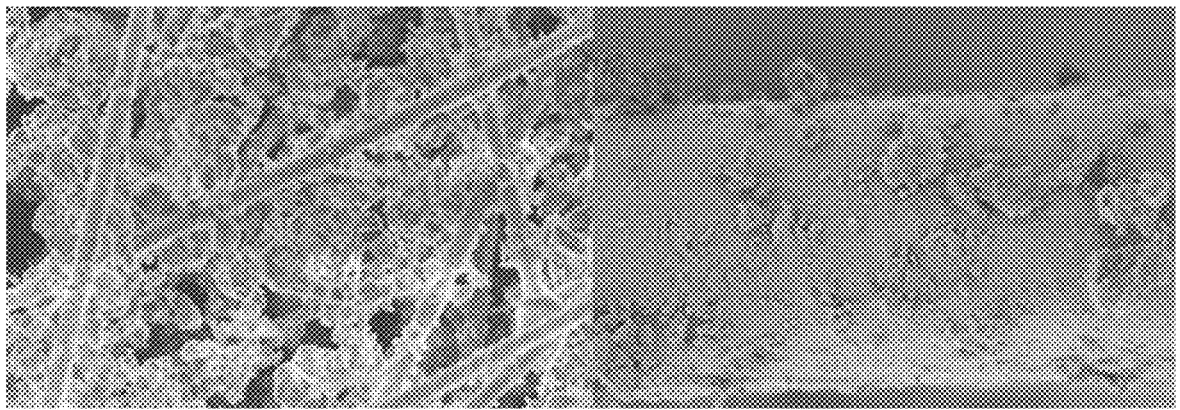
FIG. 1 is a photograph taken by a scanning electron microscope (SEM) of a silica aerogel blanket produced in Example 3 of the present invention.

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor can properly define the meaning of the words or terms to best explain the invention.

An object of the present invention is to provide a novel method for producing an aerogel blanket in order to solve problems of a typical method for producing an aerogel blanket, such as the degradation in thermal insulation performance due to non-uniform penetration of a sol into a base material for a blanket, the rise in costs due to the loss of raw materials such as a precursor solution and a catalyst solution contained in a catalyzed sol during a process, the generation of a scale in a process device due to the gelation of the catalyzed sol flown over the base material for a blanket, the generation of dust, and the like.

Method for Producing Aerogel Blanket

According to an embodiment of present invention, there is provided a method for producing an aerogel blanket, the method including 1) introducing a precursor solution and a catalyst solution into an impregnation tank and allowing a catalyzed sol to stay in the impregnation tank, 2) passing a base material for a blanket through the impregnation tank to allow the catalyzed sol to penetrate into the base material for a blanket, and 3) subjecting the base material for a blanket into which the catalyzed sol has been penetrated to gelation on a moving element, wherein a retention time of the catalyzed sol in the impregnation tank is 0.1 minutes to 40 minutes.

Hereinafter, each step of the method for producing the aerogel blanket of the present invention will be described in detail.

Step 1)

Step 1) of the present invention is a step in which a catalyzed sol is prepared and allowed to stay in an impregnation tank. A catalyzed sol can be prepared in an impregnation tank by introducing a precursor solution and a catalyst solution into the impregnation tank, and the catalyzed sol can be allowed to stay for a predetermined period of time in the impregnation tank to achieve an object of the present invention.

Products produced by a gel casting method, which is one of typically known methods for producing an aerogel blanket, account for the majority of the usage to date because of the good physical properties thereof, and currently, a gel casting method using a roll-to-roll technique is known as a commercially available technology. The gel casting method of a roll-to-roll technique can produce an aerogel blanket by spraying a liquid catalyzed sol to penetrate the same into a fiber, and then moving the fiber on a moving element until gelation is completed, followed by winding and recovering a fiber (blanket) combined with gel after the gelation is completed.

However, when a liquid catalyzed sol is sprayed to be penetrated into a fiber (a base material for a blanket), it requires a long moving element since the fiber needs to move on the moving element until gelation is completed, so that there is a problem in that the scale of equipment becomes huge in a mass production phase. Also, depending on spraying conditions, the sol can be sprayed in excess, thereby flowing out of the fiber, or the sol can be sprayed out of the fiber when sprayed, so that raw materials can be wasted unnecessarily. In addition, the gelation time of a liquid sol can vary depending on external conditions such as ambient temperature, so that a continuous production process may not be stably maintained. Also, since gelation time varies depending on an aerogel blanket produced, there is a problem in that uniform physical properties may not be maintained.

In addition, the sol has high fluidity, and thus, even after penetrated into a base material for a blanket, the sol is not uniformly present inside the base material due to external conditions such as gravity. Also, due to gel and the like outside the base material for a blanket which is formed by the sol penetrated in excess, the thickness of an aerogel blanket becomes large, or gelled aerogel can be destroyed or lost during the movement of a fibrous blanket or a process, causing the thermal insulation performance of a final product to decrease. Also, there are problems in that aerogel particles are separated in the process of cutting or bending while processing the blanket, so that dust is generated and durability is degraded.

However, in the present invention, a precursor solution and a catalyst solution are introduced into an impregnation tank to form a catalyzed sol in the impregnation tank. At this time, the retention time of the catalyzed sol is controlled to form a catalyzed sol having a viscosity which allows the same to stably penetrate into a base material for a blanket, and then the catalyzed sol is penetrated into the base material for a blanket. Thereby, even after being penetrated into the base material for a blanket, the sol can be stably present in the base material for a blanket without flowing randomly, and also, since the base material for a blanket is sufficiently impregnated into the impregnation tank in which the catalyzed sol is present to allow the sol to penetrate thereinto, the sol is uniformly penetrated into the base material for a blanket, and the formation of unnecessary gel outside the base material can be prevented.

Meanwhile, according to an embodiment of the present invention, the precursor solution and the catalyst solution can be introduced into an impregnation tank in various ways. For example, the precursor solution and the catalyst solution can be introduced into an upper portion or into a lower portion of an impregnation tank, and can be introduced into the lower portion of the impregnation tank in order to further improve the effect of impregnation at the time of the introduction of a base material for a blanket. Introducing into the lower portion of the impregnation tank can mean introducing from a downward direction of the impregnation tank.

In addition, the precursor solution and the catalyst solution can preferably be introduced into the impregnation tank simultaneously in terms of forming a catalyzed sol at the time of the introduction into the impregnation tank. At this time, being introduced simultaneously only means being introduced at the same introduction time, and does not mean being introduced at the same introduction position, and thus, introduction positions can be the same or different.

In addition, introducing the precursor solution and the catalyst solution into the impregnation tank can also be a concept including mixing the precursor solution and the catalyst solution and then introducing the same as a catalyzed sol.

In addition, according to an embodiment of the present invention, the retention time of the catalyzed sol in the impregnation tank can be 0.1 minutes to 40 minutes, preferably 0.1 minutes to 25 minutes, 0.5 minutes to 20 minutes, 1 minute to 20 minutes, or 3 minutes to 20 minutes. When the retention time of the catalyzed sol is satisfied, viscosity at the time of the penetration into a base material for a blanket in Step 2) satisfies the range to be described later, so that the penetration into the base material for a blanket is facilitated and the random fluidity of the sol is controlled to achieve stable gelation, and accordingly an aerogel can be uniformly formed in the base material for a blanket. When the retention time of the catalyzed sol of the present invention is less than 0.1 minutes, the retention time is too short. Therefore, since the viscosity of the catalyzed sol is equivalent to the viscosity of a liquid sol which has not stayed in the impregnation tank, there is a problem in that an effect which can be obtained by allowing the catalyzed sol to stay in the impregnation tank cannot be obtained. Specifically, when the retention time is less than 0.1 minutes, the fluidity of the sol is large and is out of a range in which stability is secured. Therefore, when immersed in the base material for a blanket, the sol sinks downward during gelation, which can inhibit an aerogel from being uniformly formed in the base material for a blanket, or the degree of hydrophobicity varies depending on the position within an aerogel blanket, which can cause a problem in that the degree of hydrophobicity of an aerogel blanket to be finally produced decreases. Particularly, problems of the formation of non-uniform aerogel in a base material for a blanket and the non-uniformity of the degree of hydrophobicity can be prominent in a base material for a blanket having low density such as a PET fiber. In addition, due to the random fluidity of the catalyzed sol, the amount of the catalyzed sol lost during gelation can be large, and the physical properties are not uniformly exhibited depending on the position of a produced aerogel blanket, which can cause a problem of worsening overall thermal insulation performance, dust generation amount, and hydrophobicity.

In addition, when the retention time of the catalyzed sol in the impregnation tank exceeds 40 minutes, the fluidity of the sol is greatly decreased, thereby inhibiting uniform penetration into the base material for a blanket, so that there can be a problem in that the degree of hydrophobicity of a finally produced aerogel blanket decreases due to the low hydrophobicity of the base material for a blanket. In addition, since gelation has already proceeded a lot before the penetration into the base material for a blanket, there is a difficulty in penetrating the sol into the base material for a blanket, so the ratio of an aerogel formed in the base material for a blanket decreases significantly, and accordingly there can be a problem in that a normal aerogel blanket is not produced.

In the present invention, 'the retention time of a catalyzed sol' means the time during which a catalyzed sol formed by mixing a precursor solution and a catalyst solution introduced into an impregnation tank stays in the impregnation tank, and is a concept which is clearly distinct from the retention time of a blanket (a blanket base material). The retention time of a blanket indicates the time from when the blanket is introduced into an impregnation tank until the blanket is discharged therefrom. By independently controlling the introduction and discharge flow rates of a catalyzed sol and the introduction and discharge flow rates of a blanket, the retention time of the catalyzed sol and the retention time of the blanket can be controlled differently. For example, the retention time of a blanket can be controlled to be 1 minute to 3 minutes, whereas the retention time of a catalyzed sol can be controlled to be 10 minutes, 20 minutes, or 30 seconds, and the like.

In addition, the present invention is characterized in that the retention time of a catalyzed sol in an impregnation tank can be controlled to achieve a stable viscosity range while facilitating penetration, when penetrated into a base material for a blanket, so that physical properties of a level desired in the present invention can be secured, and particularly, by allowing uniform physical properties to be formed in a produced aerogel blanket, the standard deviation of thermal conductivity can be greatly lowered. However, the retention time of a catalyzed sol may not be identified with only the retention time of a blanket, and also, the change in viscosity of the catalyzed sol when penetrating into the blanket may not be confirmed. Therefore, the retention time of the catalyzed sol and the retention time of the blanket are different technical components.

In addition, according to an embodiment of the present invention, a catalyst sol can be a solution in which a precursor solution (a gel precursor solution) and a catalyst solution are mixed as described above, and the precursor solution can preferably be a silica precursor solution.

Here, a silica precursor solution can be a solution containing water and/or a polar organic solvent in a silica precursor, and a polar organic solvent which can be used in the present invention can be an alcohol having 1 to 6 carbon atoms, specifically ethanol.

In addition, as a silica precursor included in the silica precursor solution, any precursor which can be used to form silica aerogel can be used without limitation. For example, the silica precursor can be a silicon-containing alkoxide-based compound. Specifically, the silica precursor can be tetra alkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, more specifically, in the case of the present invention, the silica precursor can be tetramethyl orthosilicate (TMOS), tetraethyl orthosilicate (TEOS), or a mixture thereof.

In addition, according to an embodiment of the present invention, the silica precursor can be a water glass solution. Here, a water glass solution can be a diluted solution prepared by adding distilled water to water glass and then mixing the same. The water glass can be sodium silicate ($Na_2SiO_3$) which is an alkali silicate salt obtained by melting silicon dioxide ($SiO_2$) and alkali.

In addition, according to an embodiment of the present invention, the silica precursor can include a pre-hydrolyzed TEOS (HTEOS). A HTEOS is an ethyl silicate oligomer material having a wide molecular weight distribution, and when synthesized into an oligomer form from a TEOS monomer, physical properties such as gelation time can be adjusted, and thus, can be easily applied according to user's reaction conditions. In addition, there is an advantage in that reproducible physical properties of a final product can be created. The HTEOS can typically be synthesized by a condensation reaction of TEOS which has undergone a partial hydration step under acidic conditions. That is, the HTEOS is in the form of an oligomer prepared by condensing TEOS, wherein the oligomer is partially hydrated.

The catalyst solution of the present invention can be a solution in which a base catalyst and a polar organic solvent are mixed, and the base catalyst serves to promote gelation by increasing the pH of a gel precursor. At this time, the polar organic solvent can be an alcohol having 1 to 6 carbon atoms, specifically ethanol. In addition, when introduced in a solid phase, the base catalyst can be precipitated. Therefore, when added in a solution phase diluted by a polar organic solvent as in the present invention, there is an effect of suppressing the generation of by-products.

The base catalyst can be an inorganic base such as sodium hydroxide and potassium hydroxide; or an organic base such as ammonium hydroxide. However, in the case of an inorganic base, a metal ion included in a compound can be coordinated to a Si—OH compound. Thus, an organic base can be preferred. Specifically, the organic base can be ammonium hydroxide ($NH_4OH$), tetramethylammonium hydroxide (TMAH, tetraethyl ammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethylaminoethanol, diethylaminoethanol, nitrilotriethanol, 2-(2-aminoethoxy)ethanol, 1-amino-2-propanol, triethanolamine, monopropanolamine, or dibutanol, and one or a mixture of two or more thereof can be used. More specifically, the base of the present invention can be ammonium hydroxide ($NH_4OH$).

The basic catalyst can be introduced in an amount such that the pH of a catalyzed sol is 4 to 8. If the pH of the catalyzed sol is out of the above range, gelation may not be easily achieved or a gelation rate may be too low, so that processability may be degraded.

In addition, according to an embodiment of the present invention, the catalyzed sol can further include an additive used in the art if necessary in terms of further improving the physical properties of an aerogel blanket. At this time, the additive can be an additive such as an opacifying agent, flame retardant, and the like.

Meanwhile, since the present invention is characterized in that a catalyzed sol is directly introduced into an impregnation tank, and a base material for a blanket is allowed to pass through the impregnation tank in which the catalyzed sol is present to achieve penetration, and thus, is characterized in that the introduction direction and introduction rate of the catalyzed sol, the distance between introduction devices or from the base material for a blanket, and the like are controlled to easily control gelation time and physical properties.

Among the above, the introduction rate of a catalyzed sol can act as a factor for controlling the retention time of the sol and the viscosity of the sol together with the discharge rate of the base material for a blanket into which the sol is penetrated, and the introduction rate which allows the retention time of the catalyzed sol in the impregnation tank to satisfy the range of the present invention can be applied without limitation.

In addition, according to an embodiment of the present invention, the catalyzed sol introduced into the impregnation tank in Step 1) can be stirred, and specifically, can stay in the impregnation tank while being stirred using a stirrer while straying in the impregnation tank. When the catalyzed sol is stirred in the impregnation tank, the stability of the catalyzed sol can be further improved, and the generation of a scale on the inner wall of the impregnation tank can be prevented.

The stirring rate of the catalyzed sol in the impregnation tank can be 50 rpm to 1,000 rpm, preferably 50 rpm to 500 rpm, more preferably 50 rpm to 300 rpm. When stirring is performed in the above range, the stability of the catalyzed sol can be further improved.

Step 2)

Step 2) of the present invention is a step in which a base material for a blanket is passed through the impregnation tank in which the catalyzed sol is staying to allow the catalyzed sol to penetrate into the base material for a blanket, and specifically, a base material for a blanket is supplied to the impregnation tank through a device for supplying a base material for a blanket and the base material for a blanket is allowed to be sufficiently impregnated into the catalyzed sol to allow the catalyzed sol to penetrate thereinto.

In addition, according to an embodiment of the present invention, the viscosity of the catalyzed sol at the time of penetrating into the base material for a blanket can be 5.5 mPa·s to 100.0 mPa·s, preferably 6.0 mPa·s to 50.0 mPa·s, 6.0 mPa·s to 30.0 mPa·s, or 8.0 mPa·s to 15.0 mPa·s.

According to an embodiment of the present invention, the catalyzed sol of the present invention is characterized by staying in the impregnation tank for a time such that the viscosity thereof at the time of penetrating into the base material for a blanket is in the above range. That is, allowing the catalyzed sol to remain in the impregnation tank can act as means for satisfying the viscosity range of the present invention at the time of penetrating into the base material for a blanket.

When in the viscosity range described above, the catalyzed sol can be more easily penetrated into the base material for a blanket, and also, the fluidity of the catalyzed sol can be controlled to achieve more stable gelation, and the loss rate of the catalyzed sol at the time of the movement on a moving element can be further reduced.

Here, the viscosity of the catalyzed sol can be a value measured under the condition of room temperature (25±5° C.) with Spindle no. 61 using the DV3T Rheometer equipment of Brookfield Co., Ltd.

In addition, the viscosity of the sol when allowing the catalyzed sol to penetrate into the base material for a blanket in Step 2) can be 1.2 times to 6.0 times the initial viscosity, preferably 1.2 times to 5.0 times the initial viscosity, and more preferably 2.0 times to 2.6 times the initial viscosity. Here, the initial viscosity indicates a viscosity immediately after a catalyzed sol is introduced into an impregnation tank, and for example, can indicate a viscosity immediately after a silica precursor solution and a catalyst solution are mixed. When in the above viscosity range, penetration into the base material for a blanket can be more uniformly achieved, and the sol can be maintained more stably after the penetration.

In addition, according to an embodiment of the present invention, the temperature inside the impregnation tank can be 1° C. to 30° C., preferably 1° C. to 25° C., and more preferably 5° C. to 25° C. When the temperature inside the impregnation tank satisfies the above range, it is preferable in that the above-described viscosity range of the catalyzed sol can be more easily achieved, and even if the retention time is relatively short, the viscosity range of a desired level can be achieved.

In addition, a base material for a blanket which can be used in the present invention can be a film, a sheet, a net, a fiber, a porous body, a foam, a non-woven body, a glass fiber, a glass fiber mat, or a laminate body of two or more layers thereof. In addition, according to the use thereof, the base material for a blanket can be one having surface roughness formed or patterned on the surface thereof. More specifically, the base material for a blanket can be a fiber capable of further improving the thermal insulation performance by including a space or a void through which silica aerogel can be easily inserted into the base material for a blanket. Also, the base material for a blanket can preferably have low thermal conductivity.

Specifically, the base material for a blanket can be polyamide, polybenzimidazole, polyaramid, an acryl resin, a phenol resin, polyester, polyetheretherketone (PEEK), polyolefin (for example, polyethylene, polypropylene, or a copolymer thereof, and the like), cellulose, carbon, cotton, wool, hemp, a non-woven fabric, a glass fiber, or ceramic wool, and the like. More specifically, the base material for a blanket can include a glass fiber or polyethylene.

In addition, according to an embodiment of the present invention, in terms of allowing a catalyzed sol having the above-described viscosity range to be uniformly introduced and impregnated into a base material for a blanket, the catalyzed sol can be penetrated into the base material for a blanket using a roller, optionally. At this time, the roller can be a spike roller, or a needle injector. A spike roller is in the form of a cylindrical roller having needle-shaped protrusions protruding therefrom, and a needle injector is in the form of a polygonal plate having needle-shaped protrusions protruding therefrom. Since both a spike roller and a needle injector have needle-shaped protrusions, a catalyzed sol having a predetermined viscosity can be easily penetrated into a base material for a blanket even at a low pressure, and can be uniformly penetrated into the inside of the base material.

In a typical production method, silica sol and a gelation catalyst are injected on a moving element as in a roll-to-roll process, so that it is difficult to achieve sufficient impregnation into a fibrous blanket on the moving element. Thereby, non-uniform impregnation occurs on the surface of the blanket, and as a result, there is a problem in that the insulation performance of a produced blanket containing aerogel is deteriorated.

In addition, when an injection amount of the silica sol and the gelation catalyst is increased in order to prevent such a problem, the amount that can be impregnated into the fibrous blanket is exceeded, and the silica sol and gelation catalyst exceeding the impregnation amount can overflow from the moving element, resulting in process loss. Furthermore, a solid, such as powder, is formed due to a subsequent gelation of the overflown mixture, which causes a problem of acting as a process trouble factor for a mechanically operating processing device.

Therefore, in order to achieve sufficient impregnation of a silica sol and a gelation catalyst into a blanket, the present invention is characterized in that the catalyzed sol is introduced into an impregnation tank and sufficient impregnation is achieved in the impregnation tank.

Step 3)

Step 3) of the present invention is characterized in that the base material for a blanket into which the catalyzed sol is penetrated is gelled on a moving element to produce a silica wet gel blanket.

In the present invention, sufficient impregnation is achieved in an impregnation tank and only then a gelation reaction proceeds. Therefore, there is an effect of producing an aerogel blanket having intended physical properties by precisely controlling gelation time according to the control of the rate, temperature, and length of the moving element.

The gelation reaction can form a network structure from a gel precursor material, wherein the network structure can be a planar mesh structure in which specific polygons having one or more types of atomic arrangement are linked to each other, or a structure in which specific polyhedrons share their vertices, edges, faces, and the like with each other to form a three-dimensional skeleton structure.

In addition, an object of the present invention is not only to reduce the loss of a gel precursor and a gelation catalyst, but also to prevent damage to the quality of a final product or an increase in gelation time.

Thereafter, the wet gel blanket of the present invention can be recovered in the form of a roll, and subjected to aging, surface modification, and drying steps, additionally.

The aging is a process in which a wet gel blanket complex is left at an appropriate temperature such that the chemical change thereof can be completely achieved. The aging can be performed by leaving the wet gel blanket complex at a temperature of 50° C. to 90° C. for 1 hour to 10 hours in a solution in which a basic catalyst such as ammonia is diluted to a concentration of 1% to 10% in an organic solvent. By performing the aging step of the present invention, the formed network structure can be more firmly formed, and mechanical stability can be enhanced.

In addition, the dried aerogel maintains a low thermal conductivity rate immediately after being dried, but absorbs water in the air due to the hydrophilic properties of a silanol group (Si—OH) on the surface of silica, so that there is a disadvantage in that the thermal conductivity is gradually increased due to the contraction of a nano-pore structure caused by a condensation reaction of the silanol group. Therefore, in order to maintain low thermal conductivity, there is a need to modify the surface of the aerogel to be hydrophobic. Therefore, a surface modification step of modifying the surface of aerogel to be hydrophobic using a surface modifier can be additionally performed. The surface modification of the present invention can be performed by adding one or more kinds of surface modifiers selected from the group consisting of trimethylchlorosilane (TMCS), hexamethyldisilazane (HMDS), methyltrimethoxysilane, trimethylethoxysilane, ethyltriethoxysilane, phenyltriethoxysilane, and polydimethylsiloxane, and more specifically, by adding hexamethyldisilazane (HMDS).

Thereafter, hydrophobic aerogel can be produced through a drying process of removing a solvent while maintaining the pore structure of the hydrophobic gel, the surface of which has been modified. The drying process can be performed by an ambient drying process or a supercritical drying process.

The ambient drying process does not require high pressure reaction conditions and a special high pressure equipment for supercritical drying, so that the process thereof is simple and economical. However, since water or an organic solvent evaporates at a high temperature, when compared with supercritical drying, ambient drying has a problem in that the thermal insulation performance is sharply reduced due to the occurrence of the destruction of the pore structure inside a gel. In addition, the above problem can be further exacerbated when drying is directly performed without the substitution with an organic solvent having a low surface tension.

In comparison, the drying of the present invention is capable of maximizing porosity by implementing supercritical drying, so that the thermal insulation performance can be far superior to that of a silica gel produced by ambient drying.

In addition, before the drying, a step of washing can be further included, if necessary.

Aerogel Blanket

The present invention also provides an aerogel blanket having a standard deviation of thermal conductivity in the aerogel blanket of 1.5 mW/m·K or less. The aerogel blanket can be one produced by the above-described production method. As an example, a catalyzed sol can be allowed to stay in an impregnation tank to satisfy the above-described viscosity range when penetrated into a blanket base material, thereby uniformly forming aerogel in the blanket base material, and the standard deviation of thermal conductivity in an aerogel blanket produced thereby can satisfy 1.5 mW/m·K or less.

In addition, the aerogel blanket can be a complex containing aerogel and a blanket base material, and can be, for example, a complex in which porous aerogel is formed inside a blanket base material. In addition, the aerogel can be silica aerogel, and at this time, an aerogel blanket can be a silica aerogel blanket.

According to an embodiment of the present invention, the standard deviation of thermal conductivity can specifically be 1 mW/m·K to 1.5 mW/m·K, 0.1 mW/m·K to 1.2 mW/m·K, or 0.3 mW/m·K to 1.0 mW/m·K. At this time, the standard deviation of thermal conductivity can be a standard deviation of thermal conductivity at room temperature (25±5° C.). Specifically, an aerogel blanket specimen of 80 cm×500 cm can be prepared, and then the specimen can be divided into 3 sections to arbitrarily measure a room-temperature thermal conductivity at 1 to points in each section to calculate a thermal conductivity standard deviation from measured thermal conductivity values using Equation 1 below. At this time, the room-temperature thermal conductivity can be a value measured at room temperature (25±5° C.) using a heat flow meter (HFM), HFM436 equipment of NETZSCH Co., Ltd.

$$\sigma = \sqrt{\frac{\sum_{k=1}^{n}(x_k - m)^2}{n}} \qquad \text{<Equation 1>}$$

σ: Thermal conductivity standard deviation n: Total number of objects $x_k$: Thermal conductivity measurement value of k-th object m: Thermal conductivity average value From the fact that the standard deviation of thermal conductivity in the aerogel blanket satisfies the above range, it can be seen that aerogel is uniformly formed in the blanket base material. The formation of uniform aerogel can indicate that the aerogel blanket exhibits uniform physical properties without having physical properties significantly different by position. That is, the aerogel blanket of the present invention satisfies the standard deviation of thermal conductivity in the above range, so that uniform physical properties are exhibited in the aerogel blanket, and the overall thermal insulation of the aerogel blanket is improved, so that an aerogel blanket having more excellent quality can be provided.

EXAMPLES

Hereinafter, Examples of the present invention will be described in detail so that those skilled in the art can easily carry out the present invention. However, the present invention can be embodied in many different forms, and is not limited to Examples set forth herein.

Example 1

A precursor solution prepared by mixing a pre-hydrolyzed TEOS (HTEOS) as a gel precursor, ethanol, distilled water, and an opacifying agent in a weight ratio of 1:0.35:0.77:0.015, and a catalyst solution prepared by mixing ethanol and ammonia water in a weight ratio of 89:1 were separately prepared. The prepared precursor solution and the prepared catalyst solution were mixed (volume ratio of 1:1) to prepare a catalyzed sol. At this time, the viscosity of the catalyzed sol was 5 mPa·s. The catalyzed sol was introduced into an impregnation tank at a rate of 1.0 L/min. The sol was filled in the impregnation tank to an amount of 33.3 L, and as a base material for a blanket, a fiber (Glass fiber mat, 10 mm) was passed through the impregnation tank into which the catalyzed sol was introduced to allow the catalyzed sol to penetrate into the fiber, while allowing the passing-through such that the fiber exiting the impregnation tank exits at a rate of 1.0 L/min, and controlling the introduction rate of the fiber into the impregnation tank such that the retention time of the fiber in the impregnation tank was 1 minute 30 seconds. At this time, the viscosity of the catalyzed sol penetrated into the fiber was 27 mPa·s. In addition, the temperature inside the impregnation tank was room temperature (25±5° C.), and the volume of the sol in the impregnation tank was maintained to be 33.3 L. The fiber which passed through the impregnation tank to allow the catalyzed sol to penetrate thereinto was gelled for 10 minutes while passing on a conveyor belt at a constant rate. A gelled wet gel blanket was aged for 2 hours in a 70° C. chamber. Thereafter, a surface modifier solution containing 5 vol % of a surface modifier (HMDS) (solvent:ethanol) based on the total volume of the solution was added to the aged wet gel blanket, and surface modification was performed for 4 hours in a 70° C. oven. After the surface modification, the wet gel blanket was placed into a supercritical extractor, and ethanol was recovered through the bottom of the extractor while injecting $CO_2$ thereto was at 75° C. and 150 bar. Therefore, $CO_2$ was vented over the course of 2 hours to produce a dried aerogel blanket.

Examples 2 to 6

An aerogel blanket was produced in the same manner as in Example 1 except that the volume of the catalyzed sol in the impregnation tank, the retention time of the catalyzed sol in the impregnation tank, the viscosity of the catalyzed sol when penetrating into the base material for a blanket were adjusted as listed in Table 1 below.

Examples 7 to 8

A precursor solution prepared by mixing a pre-hydrolyzed TEOS (HTEOS) as a gel precursor, ethanol, and distilled water in a weight ratio of 1:0.35:1.21, and a catalyst solution prepared by mixing ethanol and ammonia water in a weight ratio of 98:1 were separately prepared. The prepared precursor solution and the prepared catalyst solution were mixed (volume ratio of 1:1) to prepare a catalyzed sol. At this time, the viscosity of the catalyzed sol was 1.8 mPa·s. An aerogel blanket was produced in the same manner as in Example 1 except that as the catalyzed sol, the sol having a viscosity of 1.8 mPa·s prepared above was used and the impregnation conditions were adjusted as listed in Tables 1 and 2 below.

Examples 9 to 10

A precursor solution prepared by mixing a pre-hydrolyzed TEOS (HTEOS) as a gel precursor, ethanol, and distilled water in a weight ratio of 1:0.35:0.98, and a catalyst solution prepared by mixing ethanol and ammonia water in a weight ratio of 94:1 were separately prepared. The prepared precursor solution and the prepared catalyst solution were mixed (volume ratio of 1:1) to prepare a catalyzed sol. At this time, the viscosity of the catalyzed sol was 2.7 mPa·s. An aerogel blanket was produced in the same manner as in Example 1 except that as the catalyzed sol, the sol having a viscosity of 2.7 mPa·s prepared above was used and the impregnation conditions were adjusted as listed in Table 2 below.

Examples 11 to 12

A precursor solution prepared by mixing a pre-hydrolyzed TEOS (HTEOS) as a gel precursor, ethanol, distilled water, and an opacifying agent in a weight ratio of 1:0.35:0.77:0.015, and a catalyst solution prepared by mixing ethanol and ammonia water in a weight ratio of 89:1 were separately prepared. The prepared precursor solution and the prepared catalyst solution were mixed (volume ratio of 1:1) under the temperature condition of 5° C. to prepare a catalyzed sol. At this time, the viscosity of the catalyzed sol was 10.0 mPa·s. An aerogel blanket was produced in the same manner as in Example 1 except that as the catalyzed sol, the sol having a viscosity of 10.0 mPa·s prepared above was used and the impregnation conditions were adjusted as listed in Table 2 below.

Example 13

An aerogel blanket was produced in the same manner as in Example 1 except that a glass fiber having a fiber thickness of 5 mm was used and the impregnation conditions were adjusted as listed in Table 2 below.

Example 14

An aerogel blanket was produced in the same manner as in Example 1 except that a glass fiber having a fiber thickness of 1 mm was used and the impregnation conditions were adjusted as listed in Table 2 below.

Comparative Example 1

A precursor solution prepared by mixing a pre-hydrolyzed TEOS (HTEOS) as a gel precursor, ethanol, distilled water, and an opacifying agent $TiO_2$ in a weight ratio of 1:0.35:0.77:0.015, and a catalyst solution prepared by mixing ethanol and ammonia water in a weight ratio of 89:1 were separately prepared. The prepared precursor solution and the prepared catalyst solution were mixed (volume ratio of 1:1) to prepare a catalyzed sol. At this time, the viscosity of the catalyzed sol was 5 mPa·s. The catalyzed sol was sprayed through a nozzle at a spraying rate of 1.0 L/min on a glass fiber mat (thickness of 10 mm) passing on a conveyor belt at a constant rate without an impregnation tank. The fiber into which the catalyzed sol was penetrated was moved on a moving element to be subjected to gelation for 10 minutes, and after the gelation, an aerogel blanket was produced in the same manner as in Example 1.

Comparative Example 2

An aerogel blanket was produced in the same manner as in Example 1 except that the volume of the impregnation tank, the retention time of the catalyzed sol in the impregnation tank, the viscosity of the catalyzed sol when penetrating into the base material for a blanket were adjusted as listed in Table 1 below.

Comparative Example 3

An aerogel blanket was produced in the same manner as in Example 1 except that the impregnation conditions were adjusted as listed in Table 3 below.

Experimental Example 1: Measurement of Physical Properties of Aerogel Blanket 1) Measurement of Viscosity of Catalyzed Sol The viscosity was measured under the condition of room temperature (25±5° C.) with Spindle no. 61 using the DV3T Rheometer equipment of Brookfield Co., Ltd.

2) Loss Rate (%) of Catalyzed Sol

Using a blanket into which the catalyzed sol produced in each of Examples and Comparative Examples was penetrated, a specimen was prepared to 10 cm×10 cm. The specimen was hung in the air and then weighed after 10 minutes. The sol loss rate was calculated by Equation 2 below. The smaller the sol loss rate, the more stably the catalyzed sol is present in the blanket.

$$\text{Sol loss rate (\%)} = ((\text{Blanket into which sol has penetrated})_{0min} - (\text{Blanket into which sol has penetrated})_{10min}) / (\text{Blanket into which sol has penetrated})_{0min} \times 100 \quad \text{<Equation 2>}$$

3) Stability of Catalyzed Sol in Impregnation Tank

The change over time in the catalyzed sol in the impregnation tank was observed with the naked eye and evaluated based on the following criteria.

◎: No change over time in the catalyzed sol in the impregnation tank

○: Gelation time of the catalyzed sol was changed by approximately 10%, or some change over time in the catalyzed sol was observed.

X: Gel or a scale was formed inside the impregnation tank.

TABLE 1

| Classification | | Examples | | | | | | |
|---|---|---|---|---|---|---|---|---|
| | | 1 | 2 | 3 | 4 | 5 | 6 | 7 |
| Initial sol viscosity | (mPa · s) | 5.0 | 5.0 | 5.0 | 5.0 | 5.0 | 5.0 | 1.8 |
| Fiber thickness | (mm) | 10 | 10 | 10 | 10 | 10 | 10 | 10 |
| Temperature in impregnation tank | (° C.) | 25 | 25 | 25 | 25 | 25 | 25 | 25 |
| Volume of sol in impregnation tank | (L) | 33.3 | 20.0 | 10.0 | 3.3 | 1.0 | 0.5 | 10.0 |
| Retention time of sol in impregnation tank | | 33 m 20 s | 20 m | 10 m | 3 m 20 s | 1 m | 30 s | 10 m |
| Viscosity of sol upon fiber penetration | (mPa · s) | 27 | 13 | 10 | 10 | 8 | 7 | 7 |
| Stability of sol in impregnation tank | | ○ | ○ | ○ | ◎ | ◎ | ◎ | ○ |
| Whether or not sol is stirred in impregnation tank | | ○ | ○ | ○ | ○ | ○ | ○ | ○ |
| Sol loss rate | (%) | 1.5 | 3.3 | 3.8 | 3.9 | 4.1 | 4.9 | 3.9 |

TABLE 2

| Classification | | Examples | | | | | | |
|---|---|---|---|---|---|---|---|---|
| | | 8 | 9 | 10 | 11 | 12 | 13 | 14 |
| Initial sol viscosity | (mPa · s) | 1.8 | 2.7 | 2.7 | 10.0 | 10.0 | 5.0 | 5.0 |
| Fiber thickness | (mm) | 10 | 10 | 10 | 10 | 10 | 5 | 1 |
| Temperature in impregnation tank | (° C.) | 25 | 25 | 25 | 5 | 5 | 25 | 25 |
| Volume of sol in impregnation tank | (L) | 3.3 | 10.0 | 3.3 | 10.0 | 3.3 | 5.0 | 1.0 |
| Residence time of sol in impregnation tank | | 3 m 20 s | 10 m | 3 m 20 s | 10 m | 3 m 20 s | 10 m | 10 m |
| Viscosity of sol upon fiber penetration | (mPa · s) | 6 | 8 | 6 | 16 | 15 | 9 | 9 |
| Stability of sol in impregnation tank | | ○ | ○ | ○ | ○ | ◎ | ◎ | ○ |
| Whether or not sol is stirred in impregnation tank | | ○ | ○ | ○ | ○ | X | ○ | ○ |
| Sol loss rate | (%) | 4.2 | 3.8 | 4.4 | 3.2 | 3.2 | 1.2 | 0.7 |

TABLE 3

| Classification | | Comparative Examples | | |
|---|---|---|---|---|
| | | 1 | 2 | 3 |
| Initial sol viscosity | (mPa · s) | 5.0 | 5.0 | 5.0 |
| Fiber thickness | (mm) | 1.0 | 1.0 | 1.0 |
| Temperature in impregnation tank | (° C.) | — | 25 | 25 |
| Volume of sol in impregnation tank | (L) | — | 50.0 | 0.08 |
| Residence time of sol in impregnation tank | | — | 50 m | 5 s |
| | | (Spraying at a rate of 1.0 L/min) | | |
| Viscosity of sol upon fiber penetration | (mPa · s) | 5 | 150 or greater (Gel partially confirmed) | 5 |
| Stability of sol in impregnation tank | | — | X | ⊚ |
| Whether or not sol is stirred in impregnation tank | | — | ○ | ○ |
| Sol loss rate | (%) | 7.8 | — | 7.3 |

In Tables 1 to 3 above, the sol means a catalyzed sol.

As shown in Tables 1 to 3 above, it was confirmed that Examples 1 to 14 in which the retention time of the catalyzed sol in an impregnation tank satisfies a specific range in the present invention have excellent sol stability and a low sol loss rate value after the sol penetrates into the base material for a blanket when compared to Comparative Examples 1 to 3 in which an impregnation tank was not used or the retention time was out of the range of the present invention even when the catalyzed sol was allowed to stay in an impregnation tank.

Meanwhile, in Comparative Example 2, as the retention time of the catalyzed sol in the impregnation tank became too long, it was observed that the viscosity of the catalyzed sol rapidly increased and the sol was partially gelled in the impregnation tank even before penetrated into the blanket. Since it was impossible to measure the viscosity in a gelled portion, the viscosity of a portion in which the state of the sol was maintained to a degree at which viscosity measurement was possible. However, a viscosity of 150 mPa·s or greater was measured also in the portion in which viscosity measurement was possible.

Experimental Example 2: Measurement of Physical Properties of Aerogel Blanket 1) Amount of Aerogel in Aerogel Blanket The amount of aerogel contained in the aerogel blanket produced in each of Examples and Comparative Examples was measured by subtracting the weight of an initial blanket fiber from the weight of the produced aerogel blanket.

2) Measurement of Thermal Conductivity and Thermal Conductivity Standard Deviation Using the aerogel blanket produced in each of Examples and Comparative Examples, a specimen of 80 cm×500 cm was prepared, and then using a heat flow meter (HFM), HFM 436 equipment of NETZSCH Co., Ltd., the thermal conductivity was measured at room temperature (25±5° C.) The average of measured thermal conductivity values was calculated, and the result is shown in Table 4 below.

In addition, the specimen was divided into 3 sections, and the room-temperature thermal conductivity at 1 to 3 points was arbitrarily measured in each section to calculate a thermal conductivity standard deviation from measured thermal conductivity values using Equation 1 below.

$$\sigma = \sqrt{\frac{\sum_{k=1}^{n}(x_k - m)^2}{n}} \quad \text{<Equation 1>}$$

σ: Thermal conductivity standard deviation
n: Total number of objects
$x_k$: Thermal conductivity measurement value of k-th object
m: Thermal conductivity average value 3) Measurement of Dust Generation Amount Using the aerogel blanket produced in each of Examples and Comparative Examples, a specimen of 54 mm×254 mm was prepared. Then, predetermined vibration (Frequency: 24 Hz, Amplitude: 3 mm, Time: 12 hours) was applied to the specimen to measure the degree of dust generation by Equation 3 below.

$$\frac{W_c - W_v}{W_c} \times 100 = P_v \quad \text{<Equation 3>}$$

$W_c$=mass of control specimen
$W_v$=mass of vibrated specimen
$P_v$=percent difference, vibrated 4) Measurement of Moisture Impregnation Rate Using the aerogel blanket produced in each of Examples and Comparative Examples, a specimen of 54 mm×254 mm was prepared. Then the weight of the specimen was measured ($W_1$). The specimen was floated on distilled water of 21±2° C. and a mesh screen of 6.4 mm was placed on the specimen to sink the specimen to 127 mm below the surface of the water. 15 minutes later, the mesh screen was removed, and when the specimen rose to the surface, the specimen was picked up with a clamp and was hung vertically for 60±5 seconds. Thereafter, the weight of the specimen was measured again ($W_2$), and the moisture impregnation rate (%) thereof was calculated according to Equation 4 below.

$$\text{weight percent} = \frac{(W_2 - W_1)}{W_1} \times 100 \quad \text{<Equation 4>}$$

TABLE 4

| Classification | | Content of aerogel in aerogel blanket (wt %) | Thermal conductivity (mW/m · K) | Thermal conductivity standard deviation | Dust generation amount (%) | Moisture impregnation rate (%) |
|---|---|---|---|---|---|---|
| Examples | 1 | 33.08 | 17.3 | 1.0 | 0.15 | 1.2 |
| | 2 | 32.67 | 17.1 | 0.7 | 0.15 | 1.3 |

TABLE 4-continued

| Classification | | Content of aerogel in aerogel blanket (wt %) | Thermal conductivity (mW/m · K) | Thermal conductivity standard deviation | Dust generation amount (%) | Moisture impregnation rate (%) |
|---|---|---|---|---|---|---|
| | 3 | 32.56 | 17.1 | 0.3 | 0.14 | 1.3 |
| | 4 | 32.54 | 17.2 | 0.5 | 0.12 | 1.2 |
| | 5 | 32.49 | 16.9 | 0.6 | 0.13 | 1.3 |
| | 6 | 32.31 | 17.0 | 0.8 | 0.12 | 1.2 |
| | 7 | 32.54 | 17.5 | 0.7 | 0.14 | 1.3 |
| | 8 | 32.47 | 17.1 | 0.9 | 0.15 | 1.1 |
| | 9 | 32.56 | 17.5 | 0.8 | 0.13 | 1.2 |
| | 10 | 32.42 | 17.8 | 0.8 | 0.12 | 1.2 |
| | 11 | 32.53 | 17.0 | 0.3 | 0.12 | 1.2 |
| | 12 | 32.61 | 17.1 | 0.4 | 0.14 | 1.2 |
| | 13 | 32.82 | 16.9 | 0.5 | 0.11 | 0.9 |
| | 14 | 32.67 | 16.7 | 0.3 | 0.09 | 0.5 |
| Comparative Examples | 1 | 32.03 | 18.3 | 2.1 | 0.24 | 1.7 |
| | 2 | — | — | — | — | — |
| | 3 | 32.12 | 18.3 | 1.9 | 0.23 | 1.6 |

As shown in Table 4, it can be confirmed that Examples 1 to 14 have low values of thermal conductivity, dust generation amount, and moisture impregnation rate compared to Comparative Examples 1 to 3. Particularly, it can be confirmed that aerogel was uniformly formed in the blanket base material due to the low thermal conductivity standard deviation, and from this, it can be seen that the aerogel blanket exhibits uniform physical properties without having physical properties significantly different by position.

Meanwhile, Comparative Example 3 has a problem in that it was difficult for the sol to impregnate into the blanket since the viscosity of the sol before being introduced into the blanket was high and the stability of the sol was very poor, and accordingly, a normal aerogel blanket whose physical properties can be measured was not formed even after the gelation.

Experimental Example 3

Figure 2:
FIG. 2 is a photograph taken by a scanning electron microscope (SEM) of a silica aerogel blanket produced in Comparative Example 1 of the present invention.

A scanning electron microscope (SEM) photograph was taken for the silica aerogel blanket produced in each of Example 3 and Comparative Example 1, and is shown in FIG. 1 and FIG. 2, respectively.

Referring to FIG. 1, it can be confirmed that the silica aerogel blanket of Example 3 produced according to the production method of the present invention has silica aerogel uniformly distributed between fibrous blankets compared to Comparative Example 1 of FIG. 2.

The foregoing description of the present invention has been presented for purposes of illustration. It will be understood by those skilled in the art that various changes in form and details can be made therein without departing from the spirit and scope of the invention. It is therefore to be understood that the above-described embodiments are illustrative in all aspects and not restrictive.

The invention claimed is:

1. A method for producing an aerogel blanket, the method comprising:
   1) introducing a precursor solution and a catalyst solution comprising a base catalyst and a polar organic solvent into an impregnation tank to produce a catalyzed sol and allowing a catalyzed sol to stay in the impregnation tank to increase in viscosity;
   2) passing a base material for a blanket through the impregnation tank to allow the catalyzed sol to penetrate into the base material for a blanket; and
   3) subjecting the base material for a blanket into which the catalyzed sol has been penetrated to gelation on a conveyor belt of a device used for gel casting,
   wherein a retention time of the catalyzed sol in the impregnation tank is 0.5 minutes to 40 minutes; and
   the viscosity of the catalyzed sol when introduced into the base material is 1.2 to 6.0 times the viscosity of the catalyzed sol immediately after being produced.

2. The method of claim 1, wherein the catalyzed sol is allowed to stay in the impregnation tank such that the viscosity of the catalyzed sol is 5.5 mPa·s to 100 mPa·s when introduced into the base material for a blanket.

3. The method of claim 1, wherein the precursor solution and the catalyst solution are simultaneously introduced into the impregnation tank, or are mixed before being introduced into the impregnation tank and then introduced in the state of a catalyzed sol.

4. The method of claim 1, wherein a temperature inside the impregnation tank is 1° C. to 30° C.

5. The method of claim 1, wherein the catalyzed sol in the impregnation tank is stirred.

6. The method of claim 1, wherein the catalyzed sol is a catalyzed silica sol.

7. The method of claim 1, wherein the catalyzed sol is penetrated into the base material for a blanket using a roller.

* * * * *